United States Patent [19]
Arkkio

[11] Patent Number: 5,473,211
[45] Date of Patent: Dec. 5, 1995

[54] ASYNCHRONOUS ELECTRIC MACHINE AND ROTOR AND STATOR FOR USE IN ASSOCIATION THEREWITH

[75] Inventor: Antero Arkkio, Espoo, Finland

[73] Assignee: High Speed Tech Oy Ltd., Tampere, Finland

[21] Appl. No.: 86,880

[22] Filed: Jul. 7, 1993

[30] Foreign Application Priority Data

Jul. 7, 1992 [FI] Finland ..................................... 923115

[51] Int. Cl.[6] .................................................. H02K 17/00
[52] U.S. Cl. ........................... 310/166; 310/45; 310/180; 310/261; 310/262
[58] Field of Search ..................... 310/166, 171, 310/111, 254, 160, 161, 180, 261, 262, 45

[56] References Cited

FOREIGN PATENT DOCUMENTS

| | | |
|---|---|---|
| 2305433 | 2/1973 | Germany . |
| 2502455 | 1/1976 | Germany . |
| 3641142 | 5/1990 | Germany . |
| 1429826 | 3/1976 | United Kingdom . |
| 1427818 | 3/1976 | United Kingdom . |
| 1539498 | 1/1979 | United Kingdom . |
| 2089583 | 6/1982 | United Kingdom . |

OTHER PUBLICATIONS

Elektrische Maschinen, Vogt et al., published by Veb Verlag Technik Berlin 1972.
Elektrische Energietechnik, Boning, published by Springer–Verlag Berlin Heidelberg New York 1978.

*Primary Examiner*—R. Skudy
*Attorney, Agent, or Firm*—Pollock, Vande Sande & Priddy

[57] ABSTRACT

The invention relates to an asynchronous electric machine, wherein a rotor rotating relative to a stator is provided with an electrically conductible coating. An air gap ($\delta$) between the rotor and the stator is designed according to the following formula $$\delta = \frac{D_s - D_r}{2} > A + \frac{D_r}{B} + \frac{u}{C}$$

in which
$D_r$=outer rotor diameter (mm),
$D_s$=inner stator diameter (mm),
u=peripheral speed (m/s),
$\delta$=air gap (mm),
A=a constant, whose magnitude $\geq 0.3$, preferably 0.7–1.5, suitably 1,
B=a constant, whose magnitude $\leq 150$, preferably 50–100, suitably 70,
C=a constant whose magnitude $\leq 1200$, preferably 300–600, suitably 400; quality m/s/$_{mm}$
The peripheral speed of the rotor is more than 100 m/s. Furthermore, the rotor is provided on its shaft body with an electrically conductible coating, which is designed to be continuous and to extend over the entire operative surface area of the rotor.

28 Claims, 1 Drawing Sheet

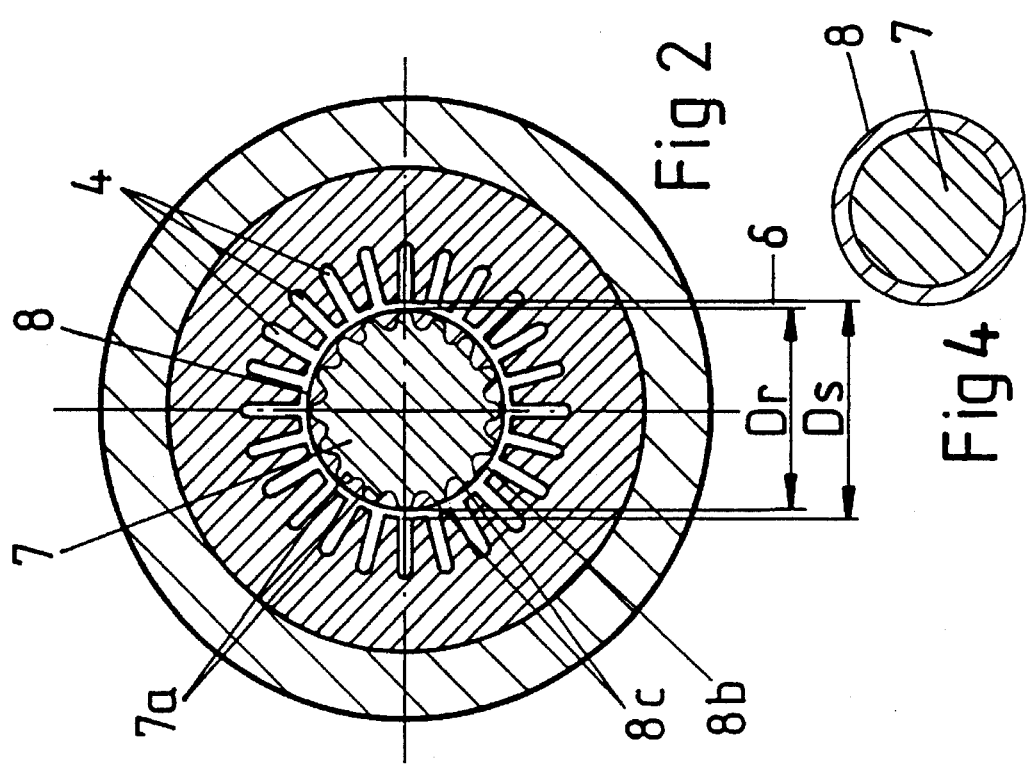
Fig 2
Fig 4
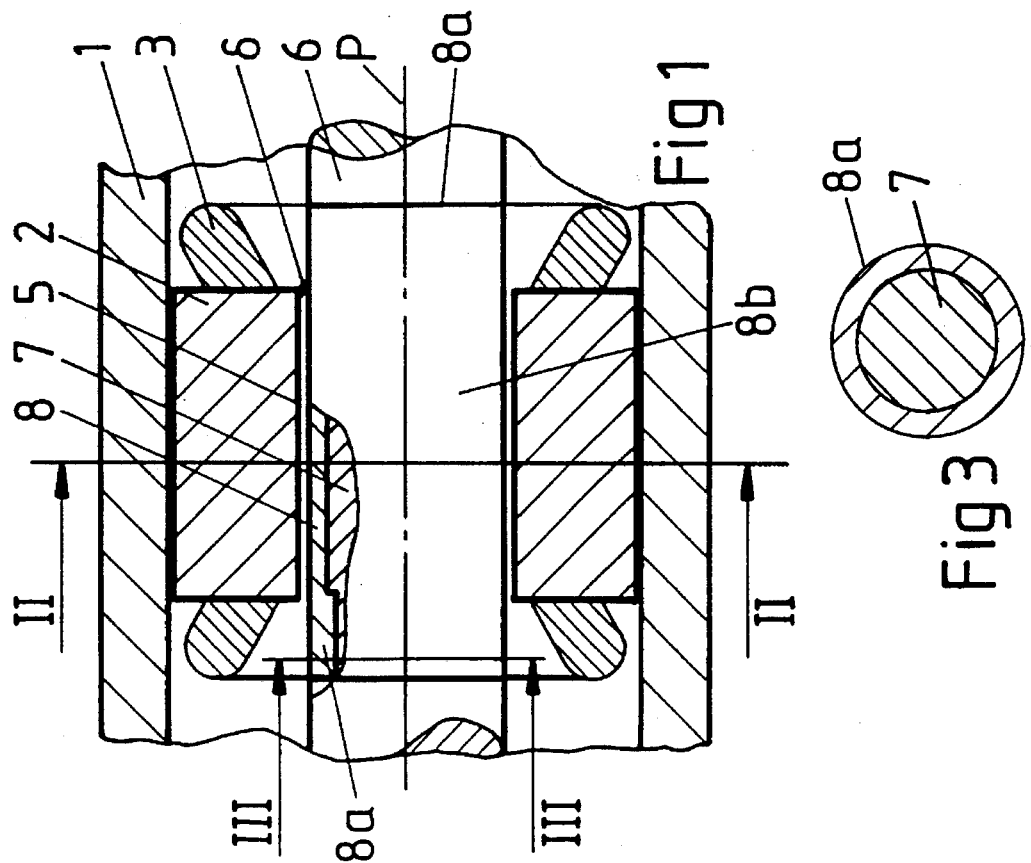
Fig 1
Fig 3

ASYNCHRONOUS ELECTRIC MACHINE AND ROTOR AND STATOR FOR USE IN ASSOCIATION THEREWITH

FIELD OF THE INVENTION

The present invention relates to an asynchronous electric machine.

BACKGROUND OF THE INVENTION

Regarding the available prior art, reference is made to publications GB-1427818, GB-1429826, DE-2502455 and DE-3641142, which disclose asynchronous electric machine designs that concentrate on so-called squirrel-cage winding designs and particularly on solutions improving the mechanical strength thereof. Efforts have also been made to improve electrical values by traditional optimization, primarily by concentrating on the reduction of eddy-current losses. It should be noted that the above publications concentrate on solutions, where the speeds of rotation are within a relatively low, traditional range of rotating speeds, used for a long time in asynchronous electric machines.

In the design of a conventional, traditional asynchronous electric machine the aim is primarily the optimization of current-heat and magnetization losses, hysteresis losses as well as eddy-current losses. The significance of so-called gas-friction losses is negligible in the design of a traditional asynchronous electric machine.

In general and simplified terms, it can be noted that losses are created in an electric machine and thus also in an asynchronous electric machine as a function of rotating speed as follows:

$$p_h(n) = P_0 + P_1 n + P_2 n^2 + P_3 n^3, \quad (1)$$

wherein n=speed of rotation, $P_h$=total losses, $P_0$=a standard component, comprising current-heat and magnetization losses, $P_1$=a constant describing hysteresis losses, $P_2$=a constant describing eddy-current losses and other losses associated with the second power of rotating speed, and $P_3$=a constant describing gas-friction losses.

It should be noted in this context that at least all the exponents shown in formula (1) are not in practice integers but, instead, fractions that are close to such figures. Indeed, formula (1) is primarily intended to illustrate interrelations between various types of losses and rotating speed. It should also be noted that constants $P_0$, $P_1$, $P_2$, $P_3$ adopt varying values depending on relevant, primarily physical factors having an effect on them. In other words, these terms $P_0$, $P_1$, $P_2$, $P_3$ are only constant relative to rotating speed in a given electric machine construction.

On the other hand, the aim in electric machine design is to minimize the ratio of total losses $P_h(n)$ to shaft output, which is $$P_{aks}(n) = k * n, \quad (2)$$

wherein k=a machine constant, primarily a constant depending on the volume of a rotor and/or an electric machine.

Thus:

$$\frac{P_h(n)}{P_{aks}(n)} = \frac{1}{k} * \left( \frac{P_0}{n} + P_1 + P_2 n + P_3 n^2 \right). \quad (2)$$

Formula (3) illustrates the effect of increasing the speed of rotation on the relative proportion of losses of the shaft output. An increase of rotational speed reduces the effect of current-heat and magnetization losses (constant $P_0$). The hysteresis losses are a portion remaining substantially constant. On the other hand, the effect of eddy-current losses (constant $P_2$) increases substantially in direct proportion to the increase of rotating speed and, furthermore, the effect of gas-friction losses (constant $P_3$) increases substantially in proportion to the second power of rotating speed.

Hence, formula (3), when of designing an electric machine having high rotating speeds, can be used to draw a conclusion that the effect of constants ($P_2$ and $P_3$) associated with eddy-current losses and gas-friction losses should be reduced by effecting such measures in designing that eddy-current losses will be minimized and gas-friction losses shall not at least increase as compared to traditional solutions. On the other hand, the magnitude of constant $P_0$ associated with current-heat and magnetization losses can even be increased, since the effect of an increase in rotating speed is inversely proportional to the ratio between such losses.

SUMMARY OF THE INVENTION

The present invention is direction to asynchronous electric machines applying high speeds of rotation, socalled high-speed technique, particularly rotational speeds exceeding substantially those at which traditional asynchronous electric machines operate. As an example, the rotational speed range of an asynchronous electric machine of the invention is in the order of more than $10^5$ revolutions per minute, whereas the traditional asynchronous electric machines have typically a peripheral speed range of less than 50 m/s and a rotational speed range of $10^3$–$3*10^3$ revolutions per minute. Thus, in this invention, the term high speed refers to the peripheral speeds of a rotating member, particularly a rotor in an asynchronous electric machine, which are more than 100 m/s, even up to 1000–2000 m/s, nevertheless typically 200–500 m/s whereby, with the most commonly applied dimensions of a rotating member, particularly rotor diameters, the rotating speed of a rotor is in the order of $10^4$–$10^5$ revolutions per minute, typically $2 * 10^4$–$2 * 10^5$ revolutions per minute, even up to $10^6$ revolutions per minute.

Referring to what is described above, it can be concluded that the prior art concept of the optimization of losses does not lead to a satisfactory result in the applications of high-speed technology.

In this invention, it has been surprisingly discovered that the size of an air gap between a rotor and a stator has a decisive significance in the high-speed technical applications of asynchronous electric machinery, especially in terms of efficiency. In this invention, it has been surprisingly discovered that the air gap between a rotor and a stator is inversely proportional to the magnitude of constants $P_2$ and $P_3$; in other words, in high-speed applications, the constants having an effect on eddy-current and gas-friction losses are, in view of physical dimensioning and design, variables whose dependence on the air gap can be expressed in a simplified form by a formula:

$$P_i \approx \frac{1}{\delta^x}, \tag{4}$$

wherein $P_i = P_2$ or $P_3$, $\Delta$=air gap, and x=degree of power $\geq 0$.

Accordingly, it can be concluded that constant $P_0$ in formula (1) is in correlation with air gap $\delta$ as follows:

$$P_0 \approx \delta^y, \tag{5}$$

wherein $P_0$=current-heat and magnetization losses, $\delta$=air-gap, and y=degree of power $\geq 0$.

Thus, the surprising discovery according to the invention can be summarized in that the air gap between a rotor and a stator can and should be increased in high-speed applications of an asynchronous electric machine for the optimization of efficiency, since constants $P_2$ and $P_3$ of the eddy-current and gas-friction losses associated with formula (1), which in turn are proportional either to second or third power relative to rotational speed and thus have a major effect in high-speed applications on these particular losses, are inversely proportional (formula 4) to the size of the air gap. On the other hand, the value of constant $P_0$ having an effect on current-heat and magnetization losses can even be increased with no resulting increase in total losses, for example, by allowing a more powerful magnetization current, since in high-speed applications the significance of this constant $P_0$ is negligible in view of total losses. In practice, the meaning of what has been stated above is that in high-speed applications the aim is to minimize eddy-current losses by way of technical design as much as possible but in a manner, however, that at least gas-friction losses do not in any case increase as compared to traditional design techniques.

In order to achieve the above objectives and to eliminate the problems of the prior art as much as possible, an asynchronous electric machine of the invention is primarily characterized in that an air gap between a rotor and a stator corresponds substantially to a formula $$\delta = \frac{D_s - D_r}{2} > A + \frac{D_r}{B} + \frac{u}{C} \tag{6}$$

in which $D_r$=outer rotor diameter (mm), $D_s$=inner stator diameter (mm), u=peripheral speed (m/s), $\delta$=air gap (mm), A=a constant with a magnitude of $\geq 0.3$, preferably 0.7–1.5, suitably 1; description mm, B=a constant with a magnitude of $\leq 150$, preferably 50–100, suitably 70, C=a constant with a magnitude of $\leq 1200$, preferably 300–600, suitably 400; description m/s/$_{mm}$, and that the rotor has a peripheral speed of more than 100 m/s.

An asynchronous electric machine designed as described above is capable of achieving a high efficiency with the rotor running at rotational speeds within a high-speed range.

Especially in view of the gas-friction losses, it can be concluded that, depending on the diameter and rotational speed of a rotor, those will be produced as follows:

$$P_3 \approx \frac{n^3 * D_r^4}{\delta^{0.2}}. \tag{7}$$

The elimination of gas-friction losses requires an effective axially directed cooling blast applied to the air gap. When the air gap is increased according to the invention especially in high-speed applications, a cooling gas, such as air blasting, can be achieved at a very high efficiency.

With traditional dimensioning instructions for an electric machine the air gap remains small, in practice the maximum with small machines is 1% and with medium-sized machines 0.5% of the rotor diameter. According to the source Huette Taschenbuecher der Technik, Energietechnik, Bend 1 Maschinen, for small machines:

$$\delta \approx 0.2 + \frac{D_r}{1000} \; [mm] \tag{8a}$$

and for medium-sized machines:

$$\delta \approx \frac{D_r}{1200} * \left( 1 + \frac{9}{2p} \right) [mm], \tag{8b}$$

wherein p=an even polar number and according to another source Vogt. K, 1972, Elektrische Maschinen, Berechnungen rotierender elektrischer Maschinen, $$\delta = (0.25-0.4) * P_{mek}^{1/4}, \tag{8c)ps}$$

wherein $\delta$=air gap [mm], and $P_{mek}$=electric power [kW].

Especially in view of eddy-current losses (constant $P_2$) in traditional solutions, it can be noted that a current running in a stator and a rotor and the grooving of the stator and the rotor result in a discontinuous distribution of air-gap induction density along the air gap (in other words, the sine-shaped distribution of air-gap induction density contains harmonic components and the distribution of induction or flux density is "stepped"). Rotation of a rotor at a speed other than the air-gap flux and discontinuity of the flux density distribution produce together increasing eddy-current losses in the rotor and the stator.

As the air gap is increased, the harmonic components of discontinuous flux density and thus the eddy-current losses are decreased. The eddy-current losses calculated with air-gap values obtained by traditional electric machine dimensioning instructions are even several decades higher.

As pointed out above, the dimensioning of an air gap according to the invention facilitates a very good control over the total losses in the difficult conditions of high-speed applications.

The invention relates also to a rotor for use in the above-described asynchronous electric machine.

As for the known rotor constructions, reference is made to the prior art which has already been explained in the above-cited references, aimed at developing so-called squirrel-cage winding solutions. The squirrel-cage winding solution is not advantageous—at least if designed with presently available constructions in high-speed applications, wherein the air gap is designed on the basis of the characterizing features set forth for an asynchronous electric machine of this invention.

A surprising discovery in this invention is that in high-speed applications the rotor coating, made of an electrically highly conductible material, must be designed to continuously cover the entire operative surface area of a rotor, this being essentially characteristic for the rotor. It is preferable that, at least over a part of the peripheral dimension of a rotor, the coating should have a radial thickness of more than 0.2 mm.

It is prior known that an equal amount of active current flows in the stator and rotor per cross-sectional area. The electric current travelling in a rotor should substantially run in the highly conductible coating in order to make current-heat losses as small as possible. Thus, the cross-sectional area of a highly conductible coating should be maximized in a manner that the coating would have an average radius as large as possible, in other words that the coating would be laid to the maximum extent upon the outer periphery of a shaft body with a substantially uniform distribution.

In a rotor of the present invention, the ratio of a current producing a loaded rotor torque to the cross-sectional area of a coating is substantially in accordance with a formula:

$$J = \frac{Q_s * N_u * I_1 * \cos\delta_1}{A_r} < k * \left( 40 + \frac{500}{D_r} \right) \quad (9)$$

wherein $J$=current density (A/mm$^2$), $Q_s$=number of stator grooves, $N_u$=number of conductors extending in stator groove, $I_1$=the root-mean-square value of a direct wave (A) in stator current, $\delta_1$=the angle between stator current and direct wave of voltage, $A_r$=the average cross-sectional area of a rotor coating (section II—II, FIG. 1) (mm$^2$), k=load factor (A/mm$^2$), (fluctuation range 1–2.5), $D_r$=numerical value of rotor diameter (mm).

The rotor load factor has a temporal average of no more than 1. In addition, the rotor load factor is momentarily no more than 2.5.

As for manufacturing technique, the coating is preferably and most commonly made on top of a magnetically conducting shaft body by using a manufacturing technique based on a quick change of linear momentum, for example by so-called blast coating, capable of providing a sufficiently firm adhesion between the shaft body and the coating while also providing the coating with a sufficient thickness. A discovery in the invention is that the adhesion can be defined as follows:

$$\delta_p > 50 \text{ MPa, preferably over 100 MPa.} \quad (10)$$

Thus, the greatest possible h (mm) thickness of an electrically conductive coating can be calculated as follows:

$$h = \frac{\delta_p * 1.8 * 10^{14}}{n^2 * D_r * \delta_{pt}}, \quad (11)$$

wherein $\delta_p$=adhesion (MPa), n=rotational speed of electric machine (1/min), $D_r$=outer rotor diameter (mm), and $\delta_{pt}$=density of coating material (kg/m$^3$).

It is also required that the yield point ($R_e$, $\delta_{0.2}$) of the shaft body material for a rotor be typically:

$$R_e > 400 \text{ MPa.} \quad (12)$$

In terms of manufacturing technique, the materials fulfilling the above criteria are capable of providing a rotor whose coating comprises a solid shape-retaining layer upon the shaft body as a sufficiently thick coating layer. Furthermore, as well-known in the art, the highly conductible materials, such as copper, are soft and have a low breaking strength. When a rotor of the invention is manufactured for example, by using a manufacturing technique based on a quick change of linear momentum, such a mechanically soft and electrically conductible coating material, having itself a poor resistance to stress, can be adhered and solidly shaped to the outer surface of a shaft body so as to provide a resistant and durable rotor structure.

According to the invention, the shaft body can be provided with a grooving which is filled with a coating material. The number of grooves can be determined as follows:

$$Q_r > \frac{D_r}{3.2}, \text{ preferably } \frac{D_r}{1-2} \quad (13)$$

wherein $Q_r$=number of grooves in a rotor, and $D_r$=outer rotor diameter/mm.

The coating of a rotor can be a layer of material having a uniform thickness or it may comprise a composite consisting of a material layer component of a uniform thickness and coating material components deposited in the grooving of a shaft body. What type of coating construction is used depends on several factors whose combined effect must be optimized at the design stage of a particular asynchronous electric machine. The grooving in a shaft body imparts discontinuity to air-gap flux density, adding further to the losses created in a stator. The losses caused by the grooving can be reduced by increasing the number of grooves. The eddy-current losses induced by the grooving are most negligible when using a solid coating of a substantially uniform thickness, corresponding to the situation in which $Q_r$ is infinite. A solid or continuous coating results in an increased demand of magnetization current in a stator winding, adding to the copper losses created in the stator grooves. Thus, one alternative is to employ a rotor construction, comprising both a grooving made in the shaft body and provided with a coating material and a continuous coating laid thereupon.

However, the differences between losses calculated in various rotor constructions are small, an essential feature being the size of an air gap and the integrity of the coating used therewith. Thus, the final selection of a rotor coating construction also depends largely on manufacturing possibilities.

Furthermore, the invention relates to a stator for use in the above-described asynchronous electric machine.

As for the available prior art, primarily dealing with traditional electric machines, reference is made to the source: Vogt K. 1972 Elektrische Maschinen, Berechnung rotierender elektrischer Maschinen. According to this source, the slot pitch in asynchronous electric machines is typically 10–45 mm (the smallest reading in small machines), the resulting number of slots being $$Q_s \leq \frac{D_s}{3.2}. \quad (14a)$$

The slotting of a stator causes discontinuity in the air-gap flux density and thus increases eddy-current losses. Hence, a surprising discovery in this invention is that in high-speed applications, wherein an air gap is built on the basis of the characterizing features for an asynchronous electric of the present invention by increasing the number of stator slots as compared to traditional instructions for electric machine design, it is possible to reduce the slotting-induced losses since the effect of slotting on the discontinuity of the air-gap flux density is reduced.

According to one essential characteristic of the stator, the number of stator slots must be as follows:

$$Q_s > \frac{D_s}{3.2}, \text{ preferably } \frac{D_s}{2}, \tag{14b}$$

wherein $Q_s$=number of stator slots, and $D_s$=inner stator diameter/mm.

Furthermore, it is preferred that the number of grooves included in a rotor fulfills the condition:

$$Q_r \geq Q_s; \tag{15}$$

in relation to the number of slots included in a stator.

Alternating current produces in a conductor placed in a stator slot a so-called current boost, which increases so-called alternating-current resistance and hence stator losses.

The increasing effect of current boost on alternating-current resistance is proportional to the second power of frequency and to the second power of the diameter of a filament included in the conductor. (The source: Vogt K. 1972. Elektrische Maschinen, Berechnung rotierender elektrischer Maschinen). Thus, another surprising discovery in this invention is that in high-speed applications, wherein an air gap is built on the basis of the characterizing features of the present invention for an asynchronous electric machine in order not to increase significantly the effect of current boost, the filament diameter must be reduced as compared to traditional solutions.

Furthermore, according to one essential characteristic of a stator of the invention, the diameter of individual filaments for use in the slot must fulfill the condition:

$$d_s \leq \frac{15000}{n * p}, \tag{16}$$

wherein p=number of terminal pairs in a machine, n=rotating speed of an electric machine [1/min], and $d_s$=filament diameter [mm].

It is obvious that the minimum phase number is two in order to have a rotating machine. As the phase number is increased, the discontinuity of air-gap flux caused by a current travelling in stator slots begins to level out and the losses induced thereby begin to diminish.

The phase number m of a high-speed asynchronous machine should be:

$$m \geq 2. \tag{17}$$

BRIEF DESCRIPTION OF THE DRAWING(S)

The present invention will be described in more detail in the following specification with reference made to the accompanying drawing. In the drawing FIG. 1 shows one embodiment of an asynchronous electric machine of the present invention in longitudinal section;

FIG. 2 shows a section taken along II—II in FIG. 1,

FIG. 3 shows a section taken along III—III in FIG. 1 closest to a rotor structure, and FIG. 4 shows an alternative design of rotor in a section of FIG. 1 similar to FIG. 2.

DETAILED DESCRIPTION OF THE PREFERRED EMBODIMENT(S)

Reference numeral 1 in the drawing shows a tubular body, inside which is placed a stator 2 with its winding 3. Stator 2 includes on the inner surface a slotting 4, which is designed as described above according to formula (14). On the other hand, the winding placed in slotting 4 is designed in accordance with the above formula (15) as far as the diameter of filaments is concerned.

According to one preferred embodiment, the stator winding 3 is designed using so-called LITZ-wire, wherein the diameter of an individual conductor filament is less than 0.4 mm, preferably less than or equal to 0.1 mm. The number of stator slots is preferably divisible by even slot number values and suitably by number 12 in three-phase asynchronous electric machines. At least some applications, to minimize the losses, the stator winding is coupled to be suitable for the control of at least two three-phase inverters (frequency transformers) phased to each other (not shown in the drawing).

Stator 2 includes a bore 5 which is provided with a rotor 6, rotating longitudinally thereof around its longitudinal axis P and journalled to body 1 (not shown). Rotor 6 comprises a combination consisting of a shaft body 7 and a coating 8 on its outer surface. Coating 8 is adapted to extend in the longitudinal direction of the rotor 6 at least over the area of stator 2 and winding 3. Shaft body 7 is at least magnetically conductive or also electrically conductive. In the illustrated embodiment the shaft body 7 is a solid structure but it can also be hollow. The shaft body 7, whose material is preferably appropriate steel, has a yield point which at least in radial direction is more than 400 MPa, especially when the shaft body 7 is a solid structure. Particularly in cases where the shaft body is designed as a hollow structure, the material of shaft body 7 must comprise a material having better tensile strength, one suitable yield point at least in the radial direction being for example, 800 MPa. Particularly in reference to FIG. 2, it can be noted that the shaft body 7 is grooved substantially in the longitudinal direction of the rotor, the number of grooves 7a corresponding to formula (13). Particularly in FIG. 4 there is shown an alternative, wherein the shaft body 7 has a smooth surface, that is the number of grooves is in principle infinite.

Rotor 6 carries a coating 8 which is made of some electrically highly conductible material, such as copper, especially shape-reinforced copper. The purpose of the coating 8 is explicitly to serve as a conductor for the total current flowing through an asynchronous electric machine, whereby the ratio of a current (amperes) creating the torque of rotor 6 to the cross-sectional area of coating 8 is typically less than 40 A/m² according to formula (9). A particularly preferred method of applying coating 8 to the outer surface of shaft body 7 is a so-called blast-coating technique. It is also possible to employ other similar methods of coating, wherein a material to be coated is adhered to a substrate, in this case particularly to shaft body 7, for example by means of a major change in linear momentum, whereby the coating material is subjected to a shape-reinforcing during the formation of the coating. It is obvious that, in addition to copper, the material of coating 8 may also comprise other electrically highly conductible materials, such as aluminium or suitable alloys or composites. Coating 8 can be thicker, especially over the section 8a of coating 8, which is located at the ends of coating 8 outside the ends of stator 2 in the longitudinal direction of the rotor and which normally in conventional solutions provides a short-circuit zone, a so-called short-circuiting ring. The length of section 8a may vary in a manner that in the longitudinal direction of rotor 6 it extends within or beyond the area of winding 3 but in most cases this section 8a terminates substantially at the end of winding 3. In this respect, reference is made particularly to FIG. 3. Especially at stator 2 and winding 3, the thickness of coating 8 is substantially at least 0.2 mm in the radial direction of rotor 6, preferably 0.5–5 mm, and even up to 1–10 mm. Particularly the ends of section 8a of coating 8 can be the thickest part of coating in the radial direction. FIG. 2 illustrates a coating composition which, unlike a material layer of equal thickness as shown in FIG. 4, comprises for example a combination of a material layer section 8b having an equal or varying thickness and coating material sections 8c placed in grooving 7a of shaft body 7. Naturally, it is obvious that in most cases coating 8 is machined on its outer surface after the coating is adhered in the above-described fashion to the outer surface of shaft body 7, which is machined so as to include a recess corresponding to the coating 8 and including for example, a grooving 7a as shown in FIG. 2, in other words, the outer surface of coating 8 in a finished rotor is substantially flush with the surface lying outside the coating 8 of shaft body 7.

The above method can be used to produce coating 8, capable of withstanding the rotational and peripheral speeds applied in high-speed applications which, especially the peripheral speed, may exceed 100 m/s, even 200–500 m/s and for rotational speed $2*10^4$–$2*10^5$ 1/min, even $10^6$, up to 1000 m/s. In these solutions, which are intended to operate at particularly high peripheral speeds, it is necessary to employ even such materials for shaft body 7 whose yield point is more than 1000 MPa.

According to the basic concept of the invention, an air gap $\delta$, which is designed according to what is defined in formula (6), is formed between the surface of bore 5 in stator 2 and the outer surface of coating 8, that is according to designations of FIG. 2, the air gap will be $(D_s-D_r)/2$.

Coating 8 can include at least partially zones or sections, wherein the coating thickness in the radial direction does not change more than at the ratio of 1:10, preferably 1:4–6. Furthermore, the coating may have a varying surface configuration, including for example, sections or zones with recesses and ridges. The thickness of coating 8 in radial direction at least in some area of coating is more than 0.5%, preferably 0.7%, and even more than 1%, but no more than 20% (those with a small diameter) of the outer rotor diameter $D_r$.

In order to further illustrate the benefits of the present invention, the following series of tests was conducted and all test constructions were aimed at providing asynchronous electric machines fulfilling high quality criteria in terms of electrical engineering.

Test machine A

This test machine was designed on the basis of the available prior art knowledge by using, especially for a rotor, a so-called squirrel-cage solution made of a copper material (see for example, GB-1,427,818) with the following main dimensions. The length of a stator in all test machines was 140 mm.

$n=1.5 * 10^5$ 1/min, $D_r=70$ mm, $\delta=0.70$ mm ($\delta \approx 0.2+D_r/1000 \approx 0.3$; formula 8a), $Q_s=24$ ($D_r/3.2$; formula 13), and $Q_r=26$ In the test machine, the depth of shaft body grooves was 2 mm max.

Test machine B (four variants)

$n=1.5 * 10^5$ 1/min, $D_r=70$ mm, $\delta=3$ mm (formula 6), $Q_{s1}=24$ or $Q_{s2}=36$ (formula 14)

$Q_{r1}=26$ or $Q_{r2}=40$ (formula 15)

The coating thickness was 1–2 mm, in other words, the depth of rotor grooves approximately 1.0 mm maximum (Thus, the rotor was as shown in FIG. 2).

Test machine C $n=1.5 * 10^5$ $D_r=70$ mm, $\delta_1=2$ mm, $\delta_2=3$ mm or $\delta_3=4$ mm (formula 6)

$Q_{s1}=24$ or $Q_{s2}=36$ (formula 14), $Q_r=\infty$.

The rotor was as shown in FIG. 4 and the coating thickness approximately 1 mm.

The following illustrates the test results in table form showing the electrical losses in relation to the shaft output in each alternative test machine.

Test results

| Test machine | Electrical losses % |
| --- | --- |
| A | 18 |
| B | |
| $B_1(Q_{s1}, Q_{r1})$ | 2.9 |
| $B_2(Q_{s2}, Q_{r1})$ | 2.5 |
| $B_3(Q_{s1}, Q_{r2})$ | 2.8 |
| $B_4(Q_{s1}, Q_{r2})$ | 2.4 |
| C | |
| $C_1(\delta_1, A_{s1})$ | 4.2 |
| $C_2(\delta_2, A_{s1})$ | 3.0 |
| $C_3(\delta_2, A_{s2})$ | 2.5 |
| $C_4(\delta_3, A_{s1})$ | 2.8 |

An essential feature in the test results is that, when an asynchronous electric machine is provided with an air gap and a rotor construction according to the present invention, the electrical losses decreased at best by more than 15% as compared to an asynchronous electric machine, manufactured by traditional technique and operating on a high-speed range. The significance of an air gap is crucial, but also a rotor construction as well as the number of slots in a stator and a rotor have an effect on losses. The test series provides a skilled person with necessary initial information in each design operation at least for experimentally effected optimization.

I claim:

1. An asynchronous electric machine, comprising an electrically conducting rotor, rotatable relative to a stator, and an air gap ($\delta$) formed therebetween, wherein said air gap ($\delta$) between the rotor and the stator is defined substantially according to the following formula $$\delta = \frac{D_s - D_r}{2} > A + \frac{D_r}{B} + \frac{u}{C}$$

in which
- $D_r$=outer rotor diameter (mm),
- $D_s$=inner stator diameter (mm),
- u=peripheral speed (m/s),
- δ=air gap (mm),
- A=a constant, whose magnitude $\geq 0.3$, preferably 0.7–1.5, suitably 1,
- B=a constant, whose magnitude $\leq 150$, preferably 50–100, suitably 70,
- C=a constant whose magnitude $\leq 1200$, preferably 300–600, suitably 400; quality $m/s/_{mm}$ and wherein the peripheral speed of the rotor is more than 100 m/s.

2. An asynchronous electric machine according to claim 1, wherein a peripheral speed range of said rotor is typically about 200–500 m/s, and wherein a rotational speed range of said rotor is typically between $2*10^4$ and $2*10^5$ revolutions per minute, with a maximum of $10^6$ revolutions per minute.

3. A rotor for use in the asynchronous electric machine according to claim 1, wherein said rotor includes a shaft body and an electrically conductive coating on its outer surface wherein said coating is made continuous and extends over an entire operative surface area of said rotor.

4. A rotor according to claim 3, wherein said coating has a variable thickness so that the ratio between the smallest and greatest coating thickness in a radial direction of said rotor is no more than 1:10 and wherein the thickness of coating in the radial direction at least in some area of said coating is more than 0.5, but not to exceed 20% of the rotor outer diameter $D_r$.

5. A rotor according to claim 3 wherein said coating comprises a layer of substantially equal thickness in the longitudinal direction of said rotor at least at the location of said stator.

6. A rotor according to claim 3, wherein at least at the location of said stator said coating comprises a combination which includes a uniform material layer section and a coating material section deposited on a grooving formed on said shaft body of said rotor.

7. A rotor according to claim 6, wherein said uniform material layer section is a layer of equal thickness at least in the longitudinal direction of said rotor at said stator location.

8. A rotor according to claim 3 wherein at least over some of its operative surface area, said coating includes zones wherein the coating has a varying surface configuration.

9. A rotor according to claim 8, wherein said varying surface configuration of the coating includes alternating recesses and ridges.

10. A rotor according to claim 3, wherein said coating includes end sections whose radial thickness exceeds that of a section of said coating which is in alignment with the stator.

11. A rotor according to claim 3, wherein the maximum thickness of said coating is in accordance with the following formula $$h \approx \frac{\delta_p * 1.8 * 10^{14}}{n^2 * D_r * \delta_{pt}}$$

wherein

- p=adherence (MPa),
- n=rotating speed of electric machine (1/min),
- $D_r$=outer rotor diameter (mm),
- $\delta_{pt}$=coating density (kg/m³), and whereby said coating over at least some of said operative surface area of the rotor has a radial thickness of over 0.2 mm, and up to 1–10 mm.

12. A rotor according to claim 6, wherein said grooving is adapted to extend substantially in the longitudinal direction of said shaft body, and wherein slots included in said grooving extend in the peripheral direction of the rotor at fixed intervals.

13. A rotor according to claim 6, wherein said grooving comprises a combination of mutually criss-crossing grooves, and wherein longitudinal directions of at least some grooves differ from that of the shaft body.

14. A rotor according to claim 3 wherein said coating is applied to the surface of the shaft body preferably by using an adhesion technique based on a change of linear momentum, particularly a blast-coating method, to produce a shape-reinforced coating, adhering to the shaft body and having an adherence ($\delta_p$) which is suitably more than 50 MPa.

15. A rotor according to claim 14 wherein said shaft body of the rotor has a yield point which at least in radial direction is more than 400 MPa, particularly with a solid shaft body structure.

16. A rotor according to claim 14 wherein said shaft body of the rotor has a yield point which at least in radial direction is more than 800 MPa, particularly with a hollow shaft body structure.

17. A rotor according to claim 6, wherein the number of slots in at least a section of said grooving provided on the shaft body and extending substantially in the longitudinal direction of the shaft body is in accordance with the following formula $$Q_r > \frac{D_r}{3.2} \text{ preferably } \frac{D_r}{1-2}$$

wherein
- $Q_r$=number of grooves, and
- $D_r$=outer rotor diameter/mm.

18. A rotor according to claim 3 wherein the peripheral speed of said rotor is more than 100 m/s.

19. A rotor according to claim 3, having its shaft body grooved and being mounted in said asynchronous electric machine having a stator provided with a slotting, wherein the number of grooves in at least a section of grooving extending substantially in the longitudinal direction of the shaft body of the rotor fulfills the condition $$Q_r \geq Q_s,$$

wherein
- $Q_r$=number of grooves in rotor, and
- $Q_s$=number of slots in stator.

20. A rotor according to claim 3, wherein the ratio of a current creating a loaded rotor torque to the cross-sectional area of said coating is substantially in accordance with the following formula:

$$J = \frac{Q_s * N_u * I_1 * \cos \delta_1}{A_r} < k * \left( 40 + \frac{500}{D_r} \right)$$

wherein

J=current density (A/mm2), $Q_s$=number of stator slots, $N_u$=number of conductors extending in a stator slot, $I_1$=root-means-square value of direct wave (A) of stator current $\delta_1$=angle between stator current and direct wave of voltage, $A_r$=average cross-sectional area of rotor coating (section II—II, FIG. 1) (mm$^2$), k=load factor (A/mm$^2$), (fluctuation range 1–2.5), $D_r$=numerical value of rotor diameter (mm).

21. A rotor according to claim 20, wherein a temporal average of said load factor (k) does not exceed 1.

22. A rotor according to claim 21, wherein said load factor (k) momentarily does not exceed 2.5.

23. A stator for use in said asynchronous electric machine according to claim 1, said stator including a slotting which is provided with a winding, wherein the number of slots in said slotting fulfills the condition:

$$Q_s > \frac{D_s}{3.2} \text{ preferably } \frac{D_s}{2}$$

wherein $Q_s$=number of slots in stator, and $D_s$=inner stator diameter/mm.

24. A stator according to claim 23, which is provided with slotting and mounted in said asynchronous electric machine, a shaft body of the rotor which is provided with at least one of a grooving extending in the longitudinal direction of the shaft body and with a slotting which partially extends substantially in the longitudinal direction of the shaft body, wherein the number of grooves in the grooving or those extending longitudinally of the grooving provided on the shaft body of the rotor fulfills the condition $$Q_r \geq Q_s$$

wherein $Q_r$=number of grooves in rotor, and $Q_s$=number of slots in stator.

25. A stator according to claim 23, wherein the number of slots in the stator is divisible by even values of slot number.

26. A stator according to claim 23, wherein, the individual filaments of a winding for use in the stator fulfill the condition $$d_s \leq \frac{15000}{n * p},$$

wherein p=number of terminal pairs in machine, n=rotational speed of electric machine, and $d_s$ filament diameter.

27. A stator according to claim 26, wherein said winding is formed of LITZ-wire, whereby the diameter of a wire filament is less than 0.4 mm.

28. A stator according to claim 27 wherein said winding is formed of LITZ-wire, whereby the diameter of a wire filament is less than 0.1 mm.

* * * * *